INVENTORS.
LYMAN J. GUNYOU
TED STOTT

3,491,765
**CORN SAVER AND PARTICLE SEPARATOR
FOR A CORN HARVESTER**
Lyman J. Gunyou and Ted Stott, Celina, Ohio, assignors to Avco Corporation, Coldwater, Ohio, a corporation of Delaware
Filed Aug. 17, 1967, Ser. No. 661,382
Int. Cl. A01f 7/00
U.S. Cl. 130—5                        2 Claims

ABSTRACT OF THE DISCLOSURE

The mechanism is for use on field going corn harvesting equipment and is intended to be located under an ear corn husking bed, other parts of the corn harvesting device having snapped such ears with husks thereon from standing stalks with such ears fed to a husking bed for husk removal. During such process a limited amount of the corn kernels are inadvertently shelled from the ears and it is worthwhile to collect such shelled kernels and to separate them from husks, dirt and other foreign particles which also come through the husking rolls below the husking bed. The mechanism disclosed includes a conveyor with upper and lower flights operating in opposite directions, the upper flight to move husks in a direction for ejection and the lower flight carrying shelled kernels over a grid or grate with small openings therein for the removal of small foreign particles smaller than corn kernels and carrying the kernels toward the opposite end of the conveyor toward a shelled corn outlet. At this outlet end adjacent the end of the conveyor element where such element moves around a sprocket, the conveyor moves closely adjacent to a curved screen and the conveyor element causes shelled corn to move through such screen but a certain amount of husks and foreign particles larger than corn kernels still remain in the saved shelled corn and these do not go through the screen but are carried around the end of the sprocket adjacent the screen and move into the upper flight region of the conveyor in a direction for removal.

Background of invention

U.S. Patent 3,110,314, issued Nov. 12, 1963, shows a corn saver mechanism having a conveyor and husk agitator drum for separating large husks from corn kernels. The instant invention is an improvement thereon providing for removal of additional smaller pieces of husks and other particles larger than corn kernels.

Summary of the invention

The invention resides in the provision of a combination of mechanism positioned under a husking bed for saving and separating corn kernels inadvertently shelled from husks and other foreign particles by the husking bed. A conveyor is provided with upper and lower flights moving in opposite directions for ejection and the lower flight moving in the opposite direction carrying kernels initially separated. Smaller husk particles not initially removed are also carried with the separated kernels and a screen is provided at the saved shelled corn outlet end of the conveyor positioned to lie adjacent the conveying element. This conveying element carries husks and other particles larger than the corn kernels around the end of the conveyor to the top flight for ejection while forcing the saved corn kernels through the screen, whereby additional separation of particles larger than corn kernels is afforded at the point where the conveying element passes the screen.

Drawings

Description of the preferred embodiment

Figure 1:
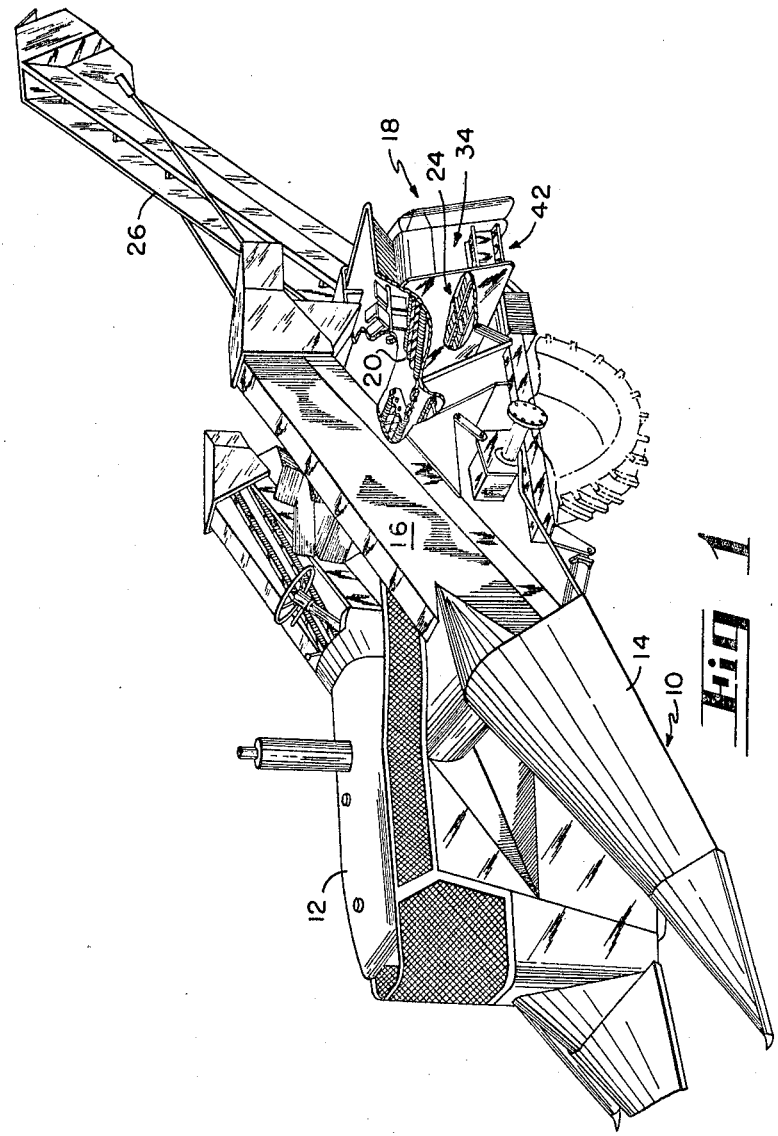
FIGURE 1 is a perspective view of a corn picker assembly including snapping and husking units assembled on a tractor.
Figure 2:
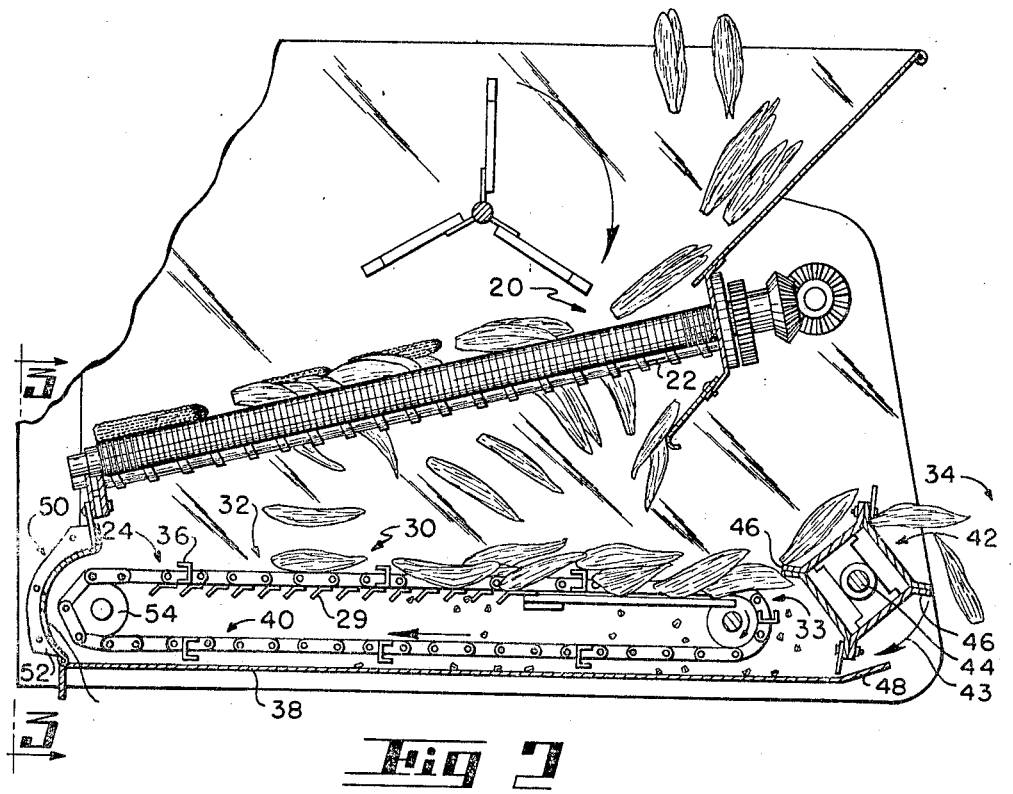
FIGURE 2 is a section through the husking and corn saver assembly unit showing the combination of mechanism accomplishing the separation of husks and other foreign particles from corn kernels saved from the husking process and falling through the husking rolls.
Figure 3:
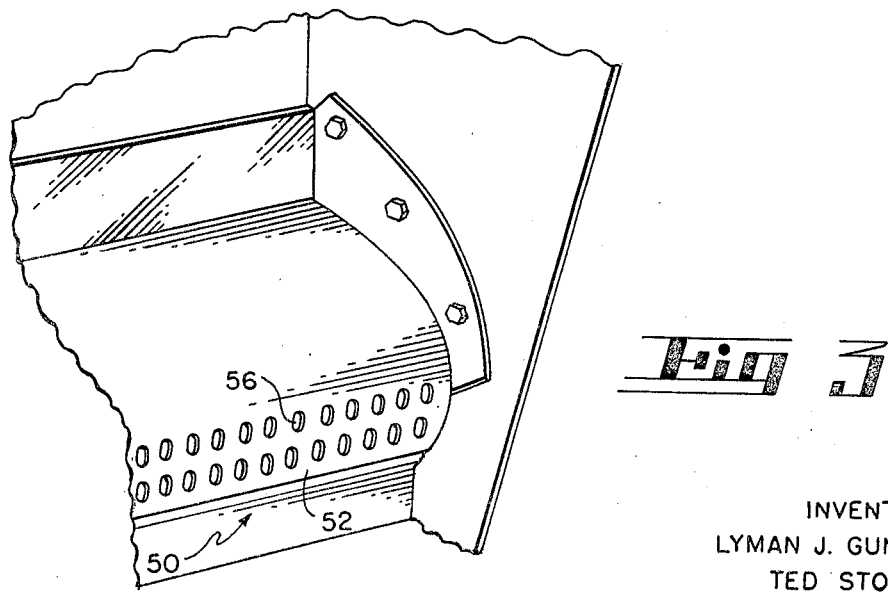
FIGURE 3 is a perspective view at the shelled corn outlet end of the corn saver assembly generally on the line 3—3 of FIGURE 2 showing the curved screen with outlet openings allowing the passage of corn kernels therethrough.

Referring to FIGURE 1, there is shown a picking and husking mechanism commonly called a corn picker, generally designated by the reference numeral 10, shown mounted on a tractor 12. The unit shown is a mechanism for picking and husking corn from two rows of corn adjacent the sides of the tractor. The picking assembly 14, similar on both sides of the tractor, first snaps ears of corn from the standing stalks and by the elevator assembly 16 carries the snapped ears with the husks still on and ejects these snapped ears into the husking unit 18, shown in cutaway view in FIGURE 1. Husking unit 18 has a so-called husking bed 20 which comprises a plurality of counter-rotating husking rolls 22 forming a bed upon which ears of corn with the husks thereon fall and are carried in a downward direction down the inclined husking bed 20, shown best in FIGURE 2. As these ears of corn are carried over the husking bed over the counter-rotating husking rolls, the rolls pull the husks from the ears and eject the husks downwardly as shown in FIGURE 2, and the husks fall by gravity downwardly upon an endless conveyor 24. The effect of the husking rolls is to pick off the husks from the ears of corn and to move the husks downwardly between the rolls and allow each ear of corn with its husk removed to move downwardly toward the central portion of the husking unit, the central portion being connected to the elevator 26, which carries the husked ears upwardly to be discharged from the elevator into a trailing wagon. The husks, as shown in FIGURE 2, fall on top of a grate 29, and these husks which fall from the husking roll have mixed with them a relatively small quantity of shelled kernels of corn which are inadvertently shelled from the ears during the husking process. This deficiency, so-called, in the husking of corn is a source of loss if not recovered, and is of course minimized to the greatest extent by improving the efficiency of the husking rolls by the provision of rubber covering and special shapes and sizes, as is well known in the art. However, no matter what efficiency is obtained, there is remaining a certain amount of shelled corn mixed with the husks which is well worth saving. The corn saver assembly 30 comprises the endless conveyor 24, the top flight 32 of which moves over a grate 29 toward the right, as shown in FIGURE 2, toward the conveyor outlet end 34. The husks are thereby carried by this conveyor toward the husk outlet 34 over the grate 29, and the slats 36 of the conveyor tend to move the husks toward the outlet 34. The conveyor 24, moving over grate 29, causes a certain amount, generally a major portion, of the shelled corn to fall through the grate 29 downwardly to the lower grate 38 of the corn saver. The return flight 40 of the endless conveyor thus serves to carry these kernels of corn over the lower grate 38 toward an outlet 50 opposite from the husk outlet. The size of the openings in this grate 38 are such that the corn kernels do not fall therethrough, but smaller particles do fall through this grate and thus screen the saved kernels of corn.

A so-called agitator drum 42 is mounted for rotation on a driven shaft 44. The agitator drum has a plurality of radially projecting vanes 46. The shaft 44 is positioned in such relation to the conveyor that the peripheral portion of the drum 42, and particularly the vanes 46 thereof, rotate in their maximum upward position substantially above the plane of the top of the upper conveyor flight 32 of conveyor 24.

The agitator drum 42 is positioned by the shaft 44 in a location such that the ends of radially extending vane portions 46 of said drum are movable on rotation of the drum contiguous to the discharge end 33 of the upper flight 32 of the conveyor 24, and further, the direction of rotation of such agitator drum, as shown by the arrow 43, is such that the said extending vane 46 portions move upwardly relative to husks moving from the discharge end 33 of said conveyor flight 32, thereby to lift and to agitate the husks upwardly from the end of said conveyor while assisting the movement of said husks toward the husk outlet 34. An extending portion 48 of the lower grate 38, which receives shelled corn, extends under the husk agitator drum 42, thus to receive the kernels of corn shaken from the husks thus agitated by the agitator drum 42, thereby to save an additional quantity of shelled corn by thus positively agitation the husks prior to their discharge from the husk discharge outlet 34. The kernels of corn shaken out by drum 42 fall downwardly adjacent the upwardly inclined extending portion 48 of the lower grate 38, so that such kernels which fall downwardly are picked up by the lower flight 40 of the conveyor and are thereby carried to the left-hand end of the conveyor toward the shelled corn outlet 50.

Adjacent the outlet region 50 a screen 52 of generally arcuate shape concentric with the sprocket 54 and spaced from the conveyor 24 is provided. It is noted that the projecting slats 36 would move very close to the curved screen 52 the plurality of discrete openings 56 in which are of such size as to allow corn kernels to pass therethrough but to screen out major particles such as parts of husks. It is noted that these foreign particles come with the shelled corn toward the outlet 50 and if the screen were not provided would go out with the saved shelled corn, but with the curved screen in the position shown the result is a second screening of the shelled corn and a carrying of the larger particles which do not go through the screen upward to the top flight 32 of the conveyor and are thus carried toward the ejection end of the conveyor for removal. Thus second classification of material is provided assuring removal of foreign particles larger than shelled corn as well as the removal of dirt and other particles smaller than shelled corn accomplished by the screen 52 and the lower grate 38 previously described.

There is, therefore, accomplished the preliminary removal of a major portion of the husks by the first movement of material coming through the husking bed onto the conveyor top flight 32 and the husking agitator drum 42 and out onto the ground and the subsequent carrying of shelled corn with certain amount of dirt as well as larger particles therein toward the shelled corn outlet with the mechanism just described which accomplishes a second separation providing for additional cleaning of the saved shelled corn.

Although the invention has been described by reference to illustrative structure found practical in actual operation it is intended that modifications may be made without departing from the fundamental principles and within the scope of the following claims.

We claim:
1. In a shelled corn savings mechanism positioned under an ear corn husking bed for separating shelled corn kernels from husks and other foreign particles comprising:
spaced sprockets defining opposite ends of a conveyor;
a conveying element operating between and around said sprockets affording upper and lower flight regions moving in opposite directions under said husking bed;
projections on said conveying element for carrying material;
a husk agitator and a husk ejector at one end of said conveyor;
a curved screen having a plurality of discrete openings selectively sized to pass only corn kernels positioned at the opposite end of said conveyor by the projections of said element, with said screen curved to lie adjacent said conveying element and projections as they pass around said sprocket from the lower to the upper flight regions;
whereby said conveying element carries husks and other foreign particles larger than corn kernels around and into said upper flight region for removal while causing corn kernels to go through said screen.

2. In a shelled corn saving mechanism positioned under an ear corn husking bed, for separating shelled corn from husks and other foreign particles comprising:
a conveyor element of the type extending between and around two spaced sprockets resulting in upper and lower flight regions moving in opposite directions;
said upper flight region positioned to carry husks for removal;
said lower flight region positioned to carry corn kernels to a shelled corn outlet;
a plate member perforated to remove foreign particles smaller than corn kernels positioned under said lower flight region retaining corn kernels in position to cause said conveyor element to carry kernels thereon toward said shelled corn outlet;
a screen adjacent said shelled corn outlet having a plurality of discrete openings of a size selectively allowing only shelled corn to move through said screen and with said screen positioned closely adjacent said conveyor element in such relation to its movement around said sprocket as will cause shelled corn to fall through said screen while remaining husks and foreign particles larger than corn kernels will be carried around said sprocket by said conveyor element into said upper flight region and moving in a direction for removal.

References Cited

UNITED STATES PATENTS 3,110,314 11/1963 Roberts et al. _____ 130—5
3,404,686 10/1968 Johnson et al. _____ 130—5

ANTONIO F. GUIDA, Primary Examiner